(12) United States Patent  
Farivar et al.

(10) Patent No.: US 11,574,313 B2  
(45) Date of Patent: Feb. 7, 2023

(54) SECURITY AND FRAUD PREVENTION TECHNIQUES BASED ON DETECTION OF A TRANSACTION CARD IN AN IMAGE

(71) Applicant: Capital One Services, LLC, McLean, VA (US)

(72) Inventors: Reza Farivar, McLean, VA (US); Michael Kubiske, McLean, VA (US); Jeremy Goodsitt, McLean, VA (US); Mark Watson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/247,718

(22) Filed: Dec. 21, 2020

(65) Prior Publication Data

US 2021/0110396 A1     Apr. 15, 2021

Related U.S. Application Data

(63) Continuation of application No. 16/283,395, filed on Feb. 22, 2019, now Pat. No. 10,872,344.

(51) Int. Cl.
    *G06Q 30/00*      (2012.01)
    *G06Q 20/40*      (2012.01)
    *G06V 20/62*      (2022.01)
    *G06V 30/10*      (2022.01)

(52) U.S. Cl.
CPC ....... *G06Q 20/409* (2013.01); *G06Q 20/4016* (2013.01); *G06V 20/62* (2022.01); *G06V 30/10* (2022.01)

(58) Field of Classification Search
CPC ................................................. G06Q 20/409
USPC ...... 705/44, 1.1, 41, 26.1, 16; 235/380, 487, 235/494, 419, 375; 364/200, 408, 900
See application file for complete search history.

(56) References Cited

U.S. PATENT DOCUMENTS

| | | | |
|---|---|---|---|
| 10,115,083 B1 * | 10/2018 | Koeppel | G06Q 20/209 |
| 10,332,261 B1 | 6/2019 | Farivar et al. | |
| 10,430,692 B1 | 10/2019 | Farivar et al. | |
| 10,872,344 B2 | 12/2020 | Farivar et al. | |
| 2016/0071105 A1 | 3/2016 | Groarke et al. | |

(Continued)

OTHER PUBLICATIONS

ProQuestDialogNPL Search History.*

(Continued)

*Primary Examiner* — John H. Holly
(74) *Attorney, Agent, or Firm* — Harrity & Harrity, LLP (57) ABSTRACT

In some implementations, a transaction card security system may detect a transaction card in an image, and may perform image processing to identify one or more character sequences or one or more designs that appear on the transaction card. The one or more character sequences or the one or more designs may identify an institution associated with the transaction card and/or a cardholder associated with the transaction card. The transaction card security system may identify the institution or the cardholder associated with the transaction card based on the one or more character sequences or the one or more designs, and may perform one or more actions relating to security of the transaction card based on detecting the transaction card in the image and identifying the institution or the cardholder associated with the transaction card.

20 Claims, 6 Drawing Sheets

(56) References Cited

U.S. PATENT DOCUMENTS

2018/0268255 A1* 9/2018 Surazhsky ........... G06V 10/772

OTHER PUBLICATIONS

Dialog., "Search Strategy", Apr. 24, 2019, 3 pages.
IEEE XPlore,"Social Media Image Retrieval Using Distilled Convolutional Neural Network for Suspicious e-Crime and Terrorist Account Detection",https://ieeexplore.ieee.org/abstract/document/7823677, Oct. 24, 2015, 3 pages.
IGI Global,"Object-of-lnterest Retrieval in Social Media Image Databases fore-Crime Forum Detection", https://www.igi-global.com/article/object-of-interest-retrieval-in-social-media-image-databases-for- . . . Jul. 3, 2015, 4 pages.

* cited by examiner

SECURITY AND FRAUD PREVENTION TECHNIQUES BASED ON DETECTION OF A TRANSACTION CARD IN AN IMAGE

RELATED APPLICATION

This application is a continuation of U.S. patent application Ser. No. 16/283,395, filed Feb. 22, 2019 (now U.S. Pat. No. 10,872,344), which is incorporated herein by reference.

BACKGROUND

Image processing may refer to the use of computing techniques or algorithms to perform image processing on digital images. Digital image processing has many advantages over analog image processing. For example, digital image processing allows a wider range of algorithms to be applied to input data and can avoid problems such as the build-up of noise and signal distortion during processing.

SUMMARY

In some implementations, a method may include receiving, by a system, an image; detecting, by the system, a transaction card in the image; determining, by the system and based on analyzing the image, at least one of: a name on the transaction card, or a card number on the transaction card; identifying, by the system, an account associated with the transaction card based on at least one of: the name on the transaction card, the card number on the transaction card, or a social media account associated with the image; and performing, by the system, an action relating to security of the account and the transaction card based on detecting the transaction card in the image and identifying the account associated with the transaction card.

In some implementations, a device may include a memory and one or more processors, communicatively coupled to the memory, configured to detect a transaction card in an image; process the image to identify one or more character sequences or one or more designs on the transaction card; determine an organization associated with the transaction card based on a character sequence, of the one or more character sequences, or a design of the one or more designs; determine an action to be performed based on the organization, wherein the action relates to security of the transaction card; and perform the action based on detecting the transaction card in the image, determining the organization, and determining the action.

In some implementations, a non-transitory computer-readable medium may store one or more instructions that, when executed by one or more processors, cause the one or more processors to detect a transaction card in an image; perform image processing to identify one or more character sequences or one or more designs that appear on the transaction card, wherein the one or more character sequences or the one or more designs identify at least one of: an institution associated with the transaction card, or a cardholder associated with the transaction card; identify the institution or the cardholder associated with the transaction card based on the one or more character sequences or the one or more designs; and perform one or more actions relating to security of the transaction card based on detecting the transaction card in the image and identifying the institution or the cardholder associated with the transaction card.

DETAILED DESCRIPTION

The following detailed description of example implementations refers to the accompanying drawings. The same reference numbers in different drawings may identify the same or similar elements.

An image of a transaction card (e.g., a credit card, a debit card, a bank card, and/or the like) may be captured and shared for people to see, such as on the Internet, a web site, an application (e.g., an "app"), a social media web site, a social media application, an Internet forum, and/or the like. For example, a new transaction card owner may take a picture of themselves with their transaction card, and may post the picture to a social media site without thinking about the consequences of such an action. As another example, a group of people at a restaurant may take a picture as a bill is being paid, and a transaction card may appear in the picture (e.g., on a table). As another example, a malicious person may secretly take a picture of another person's transaction card, and may post that picture for others to see. This may result in fraudulent use of the transaction card or other security breaches, which may be expensive and time-consuming to correct, may employ human and computing resources to correct, may damage the credit record of the cardholder, and/or the like.

Some techniques and apparatuses described herein may be used to detect a transaction card in an image, determine a security action (e.g., a countermeasure) to be performed based on such detection, and perform the security action. In this way, transaction card fraud is reduced, security of a transaction card and/or a cardholder's information is enhanced, resources that would otherwise be employed to correct transaction fraud are conserved, and/or the like.

Figure 1:
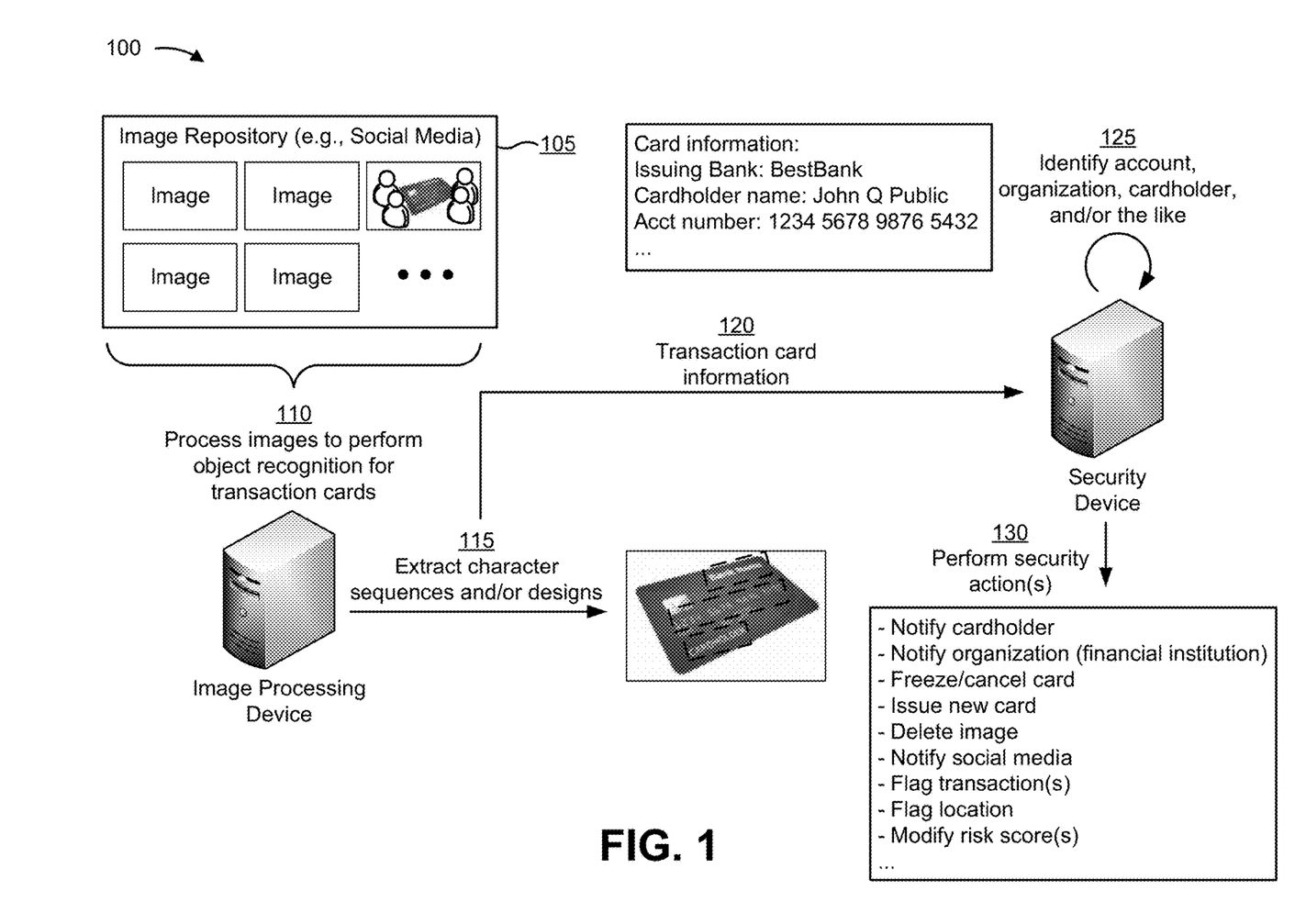
FIG. 1 is a diagram of an example implementation described herein.

FIG. 1 is a diagram of an example implementation 100 described herein.

As shown by reference number 105, a set of images (e.g., one or more images) may be stored in an image repository (e.g., memory), such as an image repository associated with a photo service, an image repository associated with a social media service, an image repository on a user device, and/or the like. The image repository may be stored, for example, on a server, in a cloud computing environment, on a user device (e.g., a smart phone, a personal computer, and/or the like), on a storage device, and/or the like. In some cases, the image repository may store hundreds, thousands, tens of thousands, hundreds of thousands, millions, etc., of images, which could not be processed manually or objectively by a human actor.

As shown by reference number 110, an image processing device may process the set of images and perform object recognition, image segmentation, and/or a similar technique to identify images that include a transaction card (e.g., a debit card, a credit card, a bank card, and/or the like). In some implementations, the image processing device may receive or obtain the set of images from an image storage device that stores the set of images. For example, the image storage device may be associated with a social media provider, a photo service provider, and/or the like. A user that uses a social media service, a photo service, and/or the like, may provide authorization for the image processing device to obtain and process images associated with the user (e.g., images stored in association with an account of the user, such as a social media account, a photo service account, and/or the like). In some implementations, the image processing device and the image storage device may be the same device, and instructions for performing techniques described herein may execute on such a device.

In some implementations, the image processing device may receive or obtain the set of images from a user device (e.g., a smart phone, a computer, and/or the like). For example, a user of the user device may provide authorization for the image processing device to obtain and process images stored on the user device. In some implementations, an image may be processed before being posted to a sharing service, such as a web site, an application, a social media web site, and/or the like. For example, a user may sign up for an image processing service to have the user's images analyzed to detect transaction cards in those images before the images are posted to a sharing service. In this way, posting of images that include transaction cards may be avoided.

In some implementations, the image processing device may process the images using object recognition, image segmentation, and/or the like. For example, the image processing device may input the images into a machine learning model, executing on the image processing device, that has been trained to recognize transaction cards in images. Using these and/or other suitable techniques, the image processing device may detect a transaction card in an image, and/or may identify images that include transaction cards. For example, the image processing device may apply one or more techniques described in U.S. patent application Ser. No. 15/963, 742 and/or U.S. patent application Ser. No. 16/250,719 to train a machine learning model to recognize a transaction card in an image, and may input the images into the machine learning model to identify transaction card(s) in the images. U.S. patent application Ser. No. 15/963,742 and U.S. patent application Ser. No. 16/250,719 are incorporated by reference herein.

In some implementations, the machine learning model may be trained (e.g., on the image processing device or another device) by inputting a training image (sometimes referred to as an input image) and a mask image to the machine learning model, such as an image segmentation model. The training image may include an image of a transaction card, and the mask image may identify a location of the transaction card in the training image (e.g., a region of the training image that includes the transaction card and/or a background region of the training image that does not include the transaction card). For example, the mask image may identify pixels in the training image that include the transaction card. In some cases, rather than receiving the mask image, the machine learning model may be trained using information that identifies pixels, in the training image, that include the transaction card.

The machine learning model may be trained using a large number of training images. Some training images may include a front of a transaction card. Some training images may include a back of a transaction card. Different training images may include transaction cards with different artwork and/or designs (e.g., on the front of the transaction card or the back of the transaction card), different names (e.g., cardholder names, financial institution names, bank names, card issuer names, and/or the like), different numbers (e.g., card numbers, expiration dates, card verification values, and/or the like), different characters (e.g., numbers, letters, and/or symbols appearing on the transaction card), different cardholder signatures, and/or the like. Additionally, or alternatively, different training images may include different backgrounds (e.g., portions of the images that do not include the transaction card) to properly train the machine learning model to recognize transaction cards in images. Additionally, or alternatively, different training images may include images of transaction cards taken at different angles, such as a direct angle which results in the transaction card appearing as a rectangle in the training image or one or more indirect angles which result in the transaction card appearing as a trapezoid in the training image. Additionally, or alternatively, different training images may include images of transaction cards taken with different camera rotations relative to the transaction card, different zoom levels, and/or other different spatial characteristics to assist the machine learning model with recognizing transaction cards in a variety of different orientations in images.

The training images may include real images (e.g., taken with a camera), synthetic images (e.g., not taken with a camera), or a combination of real images and synthetic images. In some cases, a synthetic image may be generated from a real image or from another synthetic image, such as by applying one or more deformations to the real image, such as one or more deformations described in U.S. patent application Ser. No. 15/963,742. For example, a synthetic image may be applied by applying a spatial deformation, a lighting deformation, a background deformation, and/or another type of deformation to an image from which the synthetic image is generated.

A spatial deformation may be applied to rotate a transaction card in a synthetically-generated image relative to a base image, to compress the transaction card in a synthetically-generated image relative to a base image, to stretch the transaction card in a synthetically-generated image relative to a base image, to increase or decrease magnification of the transaction card in a synthetically-generated image relative to a base image, and/or the like. A lighting deformation may be applied to modify one or more pixels from a base image to a synthetically-generated image to mimic a change in lighting, such as to mimic a change in brightness of a light source in a synthetically-generated image relative to a base image, a change in a position of a light source in a synthetically-generated image relative to a base image, a change in a direction of a light source in a synthetically-generated image relative to a base image, a change in color of a light source in a synthetically-generated image relative to a base image, addition of a light source in a synthetically-generated image relative to a base image, removal of a light source in a synthetically-generated image relative to a base image, and/or the like.

A background deformation may be applied to modify a background of a base image (e.g., a portion of the base image that does not include the transaction card) to generate a synthetic image with a different background than the base image. Some synthetic images may be generated by applying a background deformation without applying any deformations or modifications to the transaction card in the image. Some synthetic images may be generated by applying a background deformation and a deformation to the transaction card in the image (e.g., a spatial deformation, a lighting deformation, modification of one or more pixels, and/or the like). A background deformation may include replacing a background of a base image with a different background, changing a color of the background of the base image (e.g., of all background pixels or a portion of the background pixels), adding objects to the background, removing objects from the background, changing a pattern of the background, and/or the like. In some implementations, the background may be modified by applying one or more modifications to a randomly determined set of background pixels. Additionally, or alternatively, the background may be modified by applying a randomly determined set of modifications to a set of background pixels (e.g., all background pixels or a subset of the background pixels). In some implementations, the background may be modified by applying a randomly determined set of modifications to a randomly determined set of background pixels.

In some implementations, a training image may be synthetically generated by changing a name on a transaction card (e.g., a cardholder name, a bank name, a card issuer name, a financial institution name, and/or the like) that appears in a base image. For example, a synthetic image may be generated by replacing the name in the base image with another name, replacing one or more characters in the name, adding one or more characters to the name, removing one or more characters from the name, and/or the like. Additionally, or alternatively, a training image may be synthetically generated by changing a number on a transaction card (e.g., a card number, an expiration month, an expiration year, a card verification value, a phone number, and/or the like) that appears in a base image. For example, a synthetic image may be generated by replacing the number in the base image with another number, replacing one or more numbers in a string of numbers, and/or the like. In general, a training image may be synthetically generated from a base image by changing one or more characters (e.g., one or more letters, one or more numbers, one or more symbols, and/or the like) that appear on the transaction card in the base image. For example, a first letter may be replaced with a second letter, a first number may be replaced with a second number, a first symbol may be replaced with a second symbol, and/or the like.

Additionally, or alternatively, a training image may be synthetically generated by changing an appearance of the transaction card, such as by changing the artwork that appears on the transaction card, changing a design that appears on the transaction card, changing a logo that appears on the transaction card (e.g., a financial institution logo, a card issuer logo, and/or the like), changing a signature that appears on the transaction card, and/or the like. For example, a first logo may be replaced with a second logo, a first design may be replaced with a second design, first artwork may be replaced with second artwork, a first signature may be replaced with a second signature, and/or the like. In some implementations, the appearance of the transaction card may be changed by modifying one or more pixels of the transaction card in a similar manner as described above in connection with modifying background pixels. The pixels to be modified may include pixels that do not convey card information, such as pixels other than pixels that show a card number, a cardholder name, an expiration date, a card verification value, a card issuer, a financial institution, and/or the like. As described above, such pixels may be randomly selected for modification and/or may be randomly modified.

In this way, the machine learning model may be trained using a large volume of images of transaction cards without requiring a large number of real images to be used to train the machine learning model. For example, a relatively small number of real images can be used to generate a relatively large number of training images that includes the real images and synthetic images. A synthetic image may be generated from a real image or from another synthetic image to quickly generate a large volume of different images to be used to train the machine learning model. In this way, the machine learning model may be trained quickly and with a wide variety of training images, thereby increasing the likelihood of accurately detecting a transaction card in an image when the machine learning model is applied to the images in the image repository.

As shown by reference number 115, the image processing device may identify and/or extract one or more character sequences and/or one or more designs that appear on a transaction card detected in an image. A character sequence may include a sequence of numbers, letters, symbols, and/or the like. For example, a character sequence may include a name on the transaction card (e.g., a cardholder name, a name of a person, a name of a company, and/or the like), a portion of the name (e.g., a first name, a last name, a portion that is recognizable from the image, and/or the like), a card number on the transaction card (e.g., a credit card number, a debit card number, and/or the like), a portion of the card number (e.g., a major industry identifier (MII) that identifies a credit card company or a type of company associated with the transaction card, an issuer identification number (IIN) or bank identification number (BIN) that identifies a financial institution that issued the credit card, an account number, and/or the like), a name of a financial institution or company associated with the transaction card, a security code, and/or the like. A design on the card may include a logo, an image, a pattern, and/or the like. The design may identify, for example, a financial institution or company associated with the credit card, a credit card company, and/or the like.

Additionally, or alternatively, the image processing device may use image processing to determine a position of a character sequence and/or a design on the card. For example, the image processing device may determine a position relative to one or more edges of the transaction card, relative to one or more corners of the transaction card, relative to other information on the transaction card (e.g., other character sequence(s) and/or design(s)), and/or the like. In some implementations, a position of the character sequence may be used to determine the type of information represented by the character sequence (e.g., a cardholder name in the bottom left corner, a card number above the cardholder name, a bank name near the top edge, a credit card company in the bottom right corner, and/or the like). Additionally, or alternatively, the types of characters (e.g., letters, number, or symbols) included in a character sequence may be used to determine the type of information represented by the character sequence (e.g., letters for a cardholder name, numbers for a card number, and/or the like).

As shown by reference number 120, the image processing device may provide transaction card information, extracted from the image, to a security device. For example, the image processing device may transmit one or more character sequences and/or one or more designs to the security device. In some implementations, the image processing device and the security device may be part of a transaction card security system that detects transaction cards in images and performs one or more security actions based on such detection.

As shown by reference number 125, the security device may use the character sequence(s) and/or design(s) to identify an account associated with the transaction card (e.g., an account number, which may be based on or the same as the card number), an organization associated with the transaction card (e.g., a credit card company, an issuing financial institution, and/or the like), a cardholder associated with the transaction card (e.g., a person or company to which the credit card was issued), and/or the like. For example, the security device may identify an account based on a name and/or a card number on the transaction card.

Additionally, or alternatively, the security device may identify a cardholder associated with the account (e.g., based on the card number, a portion of the card number, a cardholder name that appears on the transaction card, and/or the like). Additionally, or alternatively, the security device may identify a financial institution associated with the account (e.g., based on the card number, a portion of the card number, an IIN, a BIN, a financial institution name, design, or logo that appears on the transaction card, and/or the like). The financial institution may include, for example, a financial institution that issued the transaction card (e.g., a bank, a credit union, and/or the like).

In some implementations, the security device may identify an account associated with the transaction card (e.g., a transaction card account) based on a social media account from which the image was obtained. For example, a cardholder may link a social media account to the cardholder's transaction card account, and may authorize the image processing device and/or the security device to obtain images from the social media account and analyze those images to detect transaction cards in the images and perform security actions if a transaction card is detected in the image. In this case, the security device may identify a linked transaction card account based on the social media account from which the image was obtained (e.g., and/or the name, the card number, and/or the like).

In some implementations, the security device may identify one or more people in the image (e.g., using facial recognition, an image tag that links a face of a person to a social media account of that person, and/or the like). The security device may determine a person, in the image, who is a cardholder of the transaction card. For example, the security device may determine a name of a person in the image based on a tagged name of the person, based on a social media account associated with the tag, and/or the like. The security device may compare the determined name to a name associated with the transaction card (e.g., based on a name extracted from the transaction card, based on a name associated with a card number extracted from the transaction card, and/or the like). In this way, the security device may implement an appropriate security measure based on identifying the cardholder, as described in more detail below.

As shown by reference number 130, the security device may perform an action (e.g., a security action) relating to security of the account and/or security of the transaction card. For example, the security device may perform the security action based on detecting a transaction card in an image. Additionally, or alternatively, the security device may perform the security action based on identifying an account associated with the transaction card.

In some implementations, the security action may include sending a message to a cardholder associated with the account and/or the transaction card. For example, the security device may identify a cardholder associated with the account, may determine contact information for the cardholder (e.g., a mailing address, an email address, a phone number, contact information for a social media account, and/or the like), and may use the contact information to send a message to the cardholder (e.g., via a user device associated with the cardholder, such as a computer, a smart phone, and/or the like). The message may include, for example, a text message, a phone call, a voice message, an email message, a letter to be mailed (e.g., in which case, the security device may prepare an electronic document that includes contents for the letter, an envelope for the letter, and/or the like), a social media message, and/or the like. In some implementations, the security device may use card information to look up the contact information in a data structure stored by the security device. Additionally, or alternatively, the security device may request the contact information from another device (e.g., a storage device).

Additionally, or alternatively, the security action may include sending a message to an organization associated with the account and/or the transaction card, such as a financial institution (e.g., a banking institution and/or the like), a credit card company, and/or the like. For example, the security device may identify an organization associated with the account, may determine contact information for the organization (e.g., a mailing address, an email address, a phone number, contact information for a social media account, and/or the like), and may use the contact information to send a message to the organization, in a similar manner as described above.

In some implementations, the message to the cardholder and/or the organization may include card information associated with the transaction card, so that the organization and/or the cardholder can identify an account (e.g., a cardholder account) associated with the transaction card. For example, the message may include a name extracted from the image of the transaction card, a portion of the name, a card number extracted from the image of the transaction card, a portion of the card number, and/or the like. In some implementations, the message may include the image, may include a link to the image (e.g., a uniform resource locator (URL) and/or the like), may identify a social media account associated with the image, and/or the like.

In some implementations, the security device may determine an action to be performed based on an organization associated with an account determined based on the image of the transaction card. For example, if the account is associated with a first financial institution (e.g., a financial institution that does not own or operate the security device), then the security device may perform a first action, such as sending a message to the first financial institution. If the account is associated with a second financial institution (e.g., a financial institution that owns or operates the security device), then the security device may perform a second action, such as sending a message to the cardholder.

Additionally, or alternatively, the security action may include an action associated with the transaction card, such as an action to prevent fraudulent use of the transaction card. For example, the security action may include placing the transaction card on hold (e.g., to temporarily prevent transactions that use the transaction card from being approved). Additionally, or alternatively, the security action may include cancelling the transaction card (e.g., closing the transaction card account associated with the card number). Additionally, or alternatively, the security action may include generating a new card number, for the cardholder account, to replace the card number of the transaction card. In this case, the security device may generate one or more documents (e.g., by filling in appropriate information for a letter, an envelope, and/or the like) to be mailed to the cardholder. Additionally, or alternatively, the security device may send information (e.g., a name, a new card number, and/or the like) to cause a new transaction card to be printed for the cardholder. In some implementations, the security action may include flagging the transaction card, but allowing the transaction card to be used for transactions. In this way, fraudulent use of the transaction card may be tracked, and a fraudulent user of the transaction card may be identified.

Additionally, or alternatively, the security action may include an action associated with a social media account and/or an image repository from which the image of the transaction card was obtained. For example, the security action may include sending an instruction to delete the image from the social media account. This may cause the image to be deleted from the social media account automatically (e.g., without prompting a user to approve the deletion) or with user input (e.g., by prompting a user to approve the deletion). In some implementations, the security action may include notifying a social media service provider regarding the image, so that the social media service provider can delete the image. Additionally, or alternatively, the security action may include obscuring the transaction card and/or a portion of the transaction card (e.g., a name, a card number, and/or the like) in the image. For example, the transaction card or a portion of the transaction card may be blurred, may be redacted, may be replaced (e.g., pixels of the transaction card may be replaced with other pixels, such as black pixels), and/or the like. In this way, the image may be posted without risk of fraudulent activity.

In some implementations, the image processing device and/or the security device may determine a location associated with the transaction card and/or the image. For example, the image processing device may perform object recognition to recognize an object included in the image (e.g., a landmark, a logo, and/or the like) and/or text included in the image (e.g., a name of a restaurant, a name of a location, and/or the like), and may determine the location based on the object and/or the text. Additionally, or alternatively, the image processing device and/or the security device may determine the location based on information included in a social media post that includes the image, such as a location tag, a global positioning system (GPS) tag, contents of a post that includes the image (e.g., text describing the image and/or posted in connection with the image), and/or the like. Additionally, or alternatively, the image processing device and/or the security device may determine the location based on other images and/or posts that are associated with the image of the transaction card (e.g., images and/or posts that include similar content as the image of the transaction card, images and/or posts that are posted around the same time as the image of the transaction card, and/or the like), and/or the like. Additionally, or alternatively, the image processing device and/or the security device may determine the location based on a time at which the image was posted and a corresponding time of a transaction for which the transaction card was used (e.g., and a location at which the transaction card was used). The location may include, for example, a geographic location, a merchant location, a zip code, and/or the like.

In some implementations, if the image processing device determines the location, then the image processing device may indicate the location to the security device (e.g., the location may be identified in card information). In some implementations, the security device may perform a security action based on the location. For example, the location may be indicated in a message sent to the cardholder, the organization, and/or the like. Additionally, or alternatively, the security device may update a risk score associated with the location (e.g., indicating that transactions occurring at this location have a higher level of risk, transaction cards used in the location have a higher level of risk, cardholders that live in, travel to, or perform transactions at the location have a higher level of risk, and/or the like). Additionally, or alternatively, the security action may include updating a risk score associated with the cardholder (e.g., assigning a higher level of risk to the cardholder). Additionally, or alternatively, the security action may include updating a risk score for one or more other cardholders that have a similar profile as the cardholder (e.g., similar demographics, similar patterns of transactions, and/or the like). In some implementations, the risk score may be used to determine whether to approve or deny a transaction, whether to contact a cardholder to approve transactions that occur at the location, and/or the like.

In some implementations, such as when an image is processed prior to posting (e.g., to a social media account and/or the like), the security action may include sending a notification that the image includes a transaction card. For example, a user may provide input, to a user device, to post an image to social media. Before the image is posted, the image processing device and/or the security device (e.g., operations of which may be performed locally on the user device or remote from the user device) may analyze the image. If a transaction card is not detected in the image, then the image processing device and/or the security device may permit the image to be posted. If a transaction card is detected, then the image processing device and/or the security device may output a notification, to the user device, that a transaction card was detected in the image. Based on the notification, the user may provide input to prevent the image from being posted, to request that the transaction card be obscured in the image and that the image be posted, and/or the like.

In this way, transaction card fraud may be reduced, security of a transaction card and/or a cardholder's information may be enhanced, resources that would otherwise be employed to correct transaction fraud can be conserved, and/or the like. Therefore, the image processing device and/or security device, as described herein, may conserve any computing resources (e.g., processing resources, memory resources, power resources, and/or the like) and/or network resources involved in correcting any fraudulent activity that would have been allowed without the use of the image processing device and/or security device described herein.

As indicated above, FIG. 1 is provided as an example. Other examples may differ from what is described with regard to FIG. 1.

Figure 2:
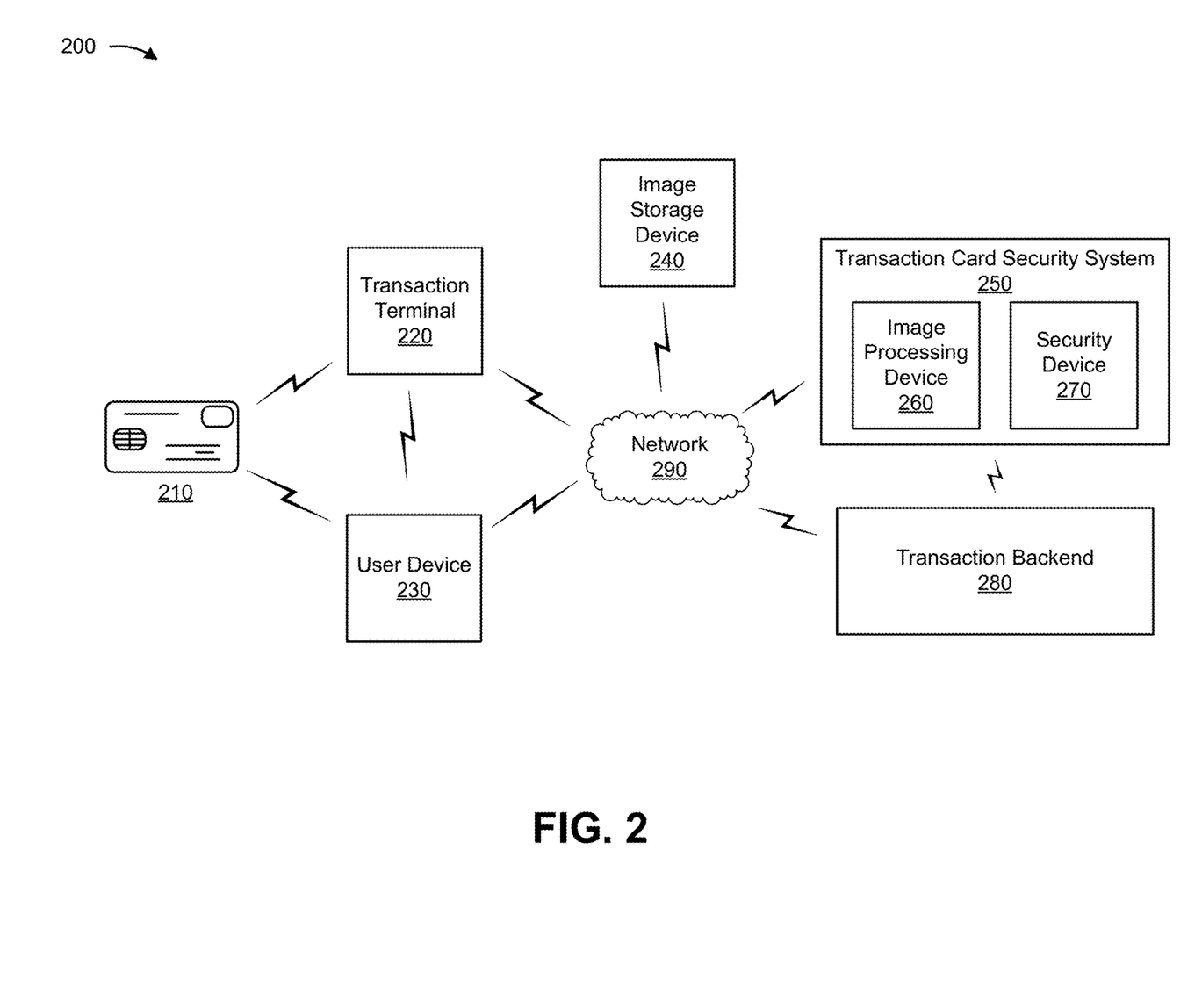
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction card 210, a transaction terminal 220, a user device 230, an image storage device 240, a transaction card security system 250, an image processing device 260, a security device 270, a transaction backend 280, and/or a network 290. In environment 200, transaction card 210 may communicate data associated with or relating to a transaction with transaction terminal 220, which facilitates processing the transaction through communication with transaction backend 280 via network 290. Devices of environment 200 may interconnect via wired connections, wireless connections, or a combination of wired and wireless connections.

Transaction card 210 includes a transaction card capable of being used to perform a transaction, such as a credit card, a debit card, a bank card, a gift card, a rewards card, a security card, an ATM card, and/or the like. Transaction card 210 is capable of storing and/or communicating data for a point of sale (PoS) transaction with transaction terminal 220. For example, transaction card 210 may store or communicate data including account information (e.g., an account identifier, a cardholder identifier, etc.), expiration information of transaction card 210, card information, banking information, transaction information (e.g., a payment token), and/or the like. For example, to store or communicate the data, transaction card 210 may include a magnetic strip and/or an integrated circuit (IC) chip (e.g., a EUROPAY®, MASTERCARD®, VISA® (EMV) chip, or the like).

Transaction terminal 220 includes one or more devices capable of receiving, generating, storing, processing, and/or providing information associated with facilitating a transaction (e.g., a PoS transaction). For example, transaction terminal 220 may include a communication device and/or computing device capable of receiving data from transaction card 210 and/or processing a transaction based on the data. In some implementations, transaction terminal 220 may include a desktop computer, a laptop computer, a tablet computer, a handheld computer, and/or a mobile phone (e.g., a smart phone, a radiotelephone, etc.). Transaction terminal 220 may be owned and/or operated by one or more individuals or businesses engaged in a sale of goods or services (e.g., one or more merchants, vendors, service providers, and/or the like).

Transaction terminal 220 may include one or more devices to facilitate processing a transaction via transaction card 210. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or interaction or authorization from a cardholder of transaction card 210. Example input devices of transaction terminal 220 may include a number keypad, a touchscreen, a magnetic strip reader, a chip reader, and/or an RF signal reader. A magnetic strip reader of transaction terminal 220 may receive transaction card data as a magnetic strip of transaction card 210 is swiped along the magnetic strip reader. A chip reader of transaction terminal 220 may receive transaction card data from an IC chip (e.g., an EMV chip) of transaction card 210 when the chip is placed in contact with the chip reader. An RF signal reader of transaction terminal 220 may enable contactless transactions from transaction card 210 by obtaining transaction card data wirelessly from transaction card 210 as transaction card 210 comes within a range of transaction terminal 220 such that the RF signal reader may detect an RF signal from an RF antenna of transaction card 210. Example output devices of transaction terminal 220 may include a display device, a speaker, a printer, and/or the like.

User device 230 includes one or more devices capable of receiving, generating, storing, processing, and/or providing information associated with a transaction card, a social media account, and/or the like. For example, user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Image storage device 240 includes one or more devices capable of storing information associated with images. For example, image storage device 240 may include a server, a device in a data center, a device in a cloud computing environment, a user device (e.g., user device 230), and/or the like. Image storage device 240 may store a set of images (e.g., one or more images) in an image repository (e.g., memory), such as an image repository associated with a photo service, an image repository associated with a social media service, an image repository on a user device, and/or the like. In some cases, the image storage device 240 and/or multiple image storage devices 240 may store hundreds, thousands, tens of thousands, hundreds of thousands, millions, etc., of images. In some implementations, the image storage device 240 may be associated with a social media provider, a photo service provider, a cardholder, and/or the like.

Transaction card security system 250 includes one or more devices capable of analyzing one or more images (e.g., using image processing) and/or performing one or more actions (e.g., security actions) based on a result of analyzing the one or more images. As shown, in some implementations, transaction card security system 250 may include an image processing device 260 to analyze the one or more images. Additionally, or alternatively, transaction card security system 250 may include a security device 270 to perform the one or more actions. Transaction card security system 250, image processing device 260, and/or security device 270 may include, for example, a server, an image processor, a device in a data center, a device in a cloud computing environment, a user device (e.g., user device 230), and/or the like.

Transaction backend 280 includes one or more devices capable of authorizing and/or facilitating a transaction. For example, transaction backend 280 may include one or more servers and/or computers to store and/or provide information (e.g., authorizations, balances, payment tokens, security information, account information, and/or the like) associated with processing a transaction via transaction terminal 220. In some implementations, transaction backend 280 may include one or more devices associated with a bank and/or a transaction card organization that authorizes the transaction and/or facilitates a transfer of funds or payments between an account of a cardholder of transaction card 210 and an account of an individual or business of transaction terminal 220. For example, transaction backend 280 may include one or more devices of one or more issuing banks associated with a cardholder of transaction card 210, one or more devices of one or more acquiring banks (or merchant banks) associated with transaction terminal 220, and/or one or more devices associated with one or more card associations (e.g., VISA®, MASTERCARD®, and/or the like) associated with transaction card 210. Accordingly, in response to receiving card information associated with transaction card 210 from transaction terminal 220, various banking institutions and/or card associations of transaction backend 280 may communicate to authorize the transaction and/or transfer funds between one or more accounts associated with transaction card 210 and/or transaction terminal 220. Transaction backend 280 may include one or more devices associated with security that may provide or deny authorization associated with the transaction (e.g., based on information received from transaction card security system 250). In some implementations, transaction backend 280 may store associations between card information and an account.

Network 290 includes one or more wired and/or wireless networks. For example, network 290 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple devices and/or distributed devices. Additionally, or alternatively, a set of devices (e.g., one or more devices) of environment 200 may perform one or more functions described as being performed by another set of devices of environment 200.

Figure 3:
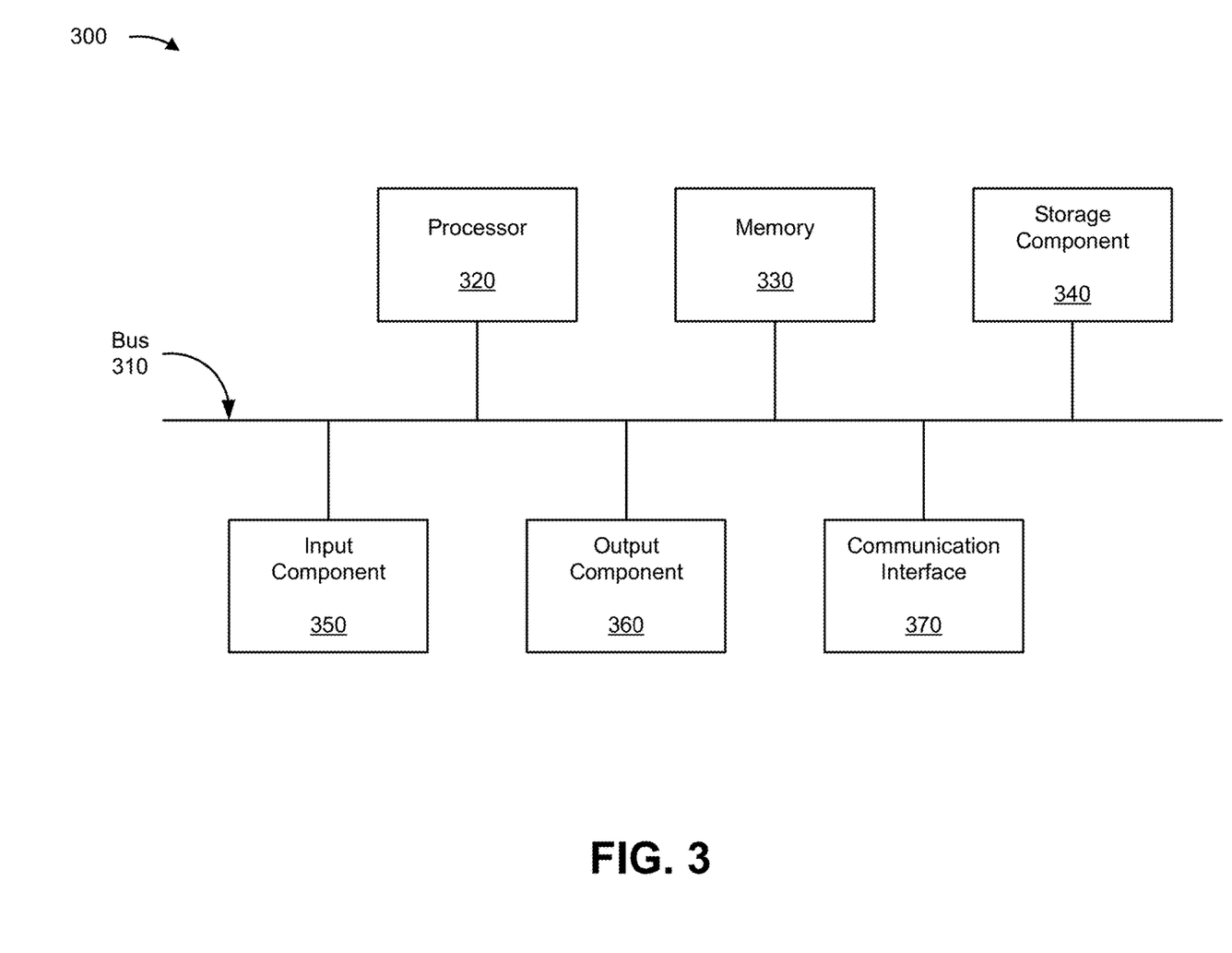
FIG. 3 is a diagram of example components of one or more devices of FIG. 2.

FIG. 3 is a diagram of example components of a device 300. Device 300 may correspond to transaction card 210, transaction terminal 220, user device 230, image storage device 240, transaction card security system 250, image processing device 260, security device 270, transaction backend 280, and/or the like. In some implementations, transaction card 210, transaction terminal 220, user device 230, image storage device 240, transaction card security system 250, image processing device 260, security device 270, and/or transaction backend 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
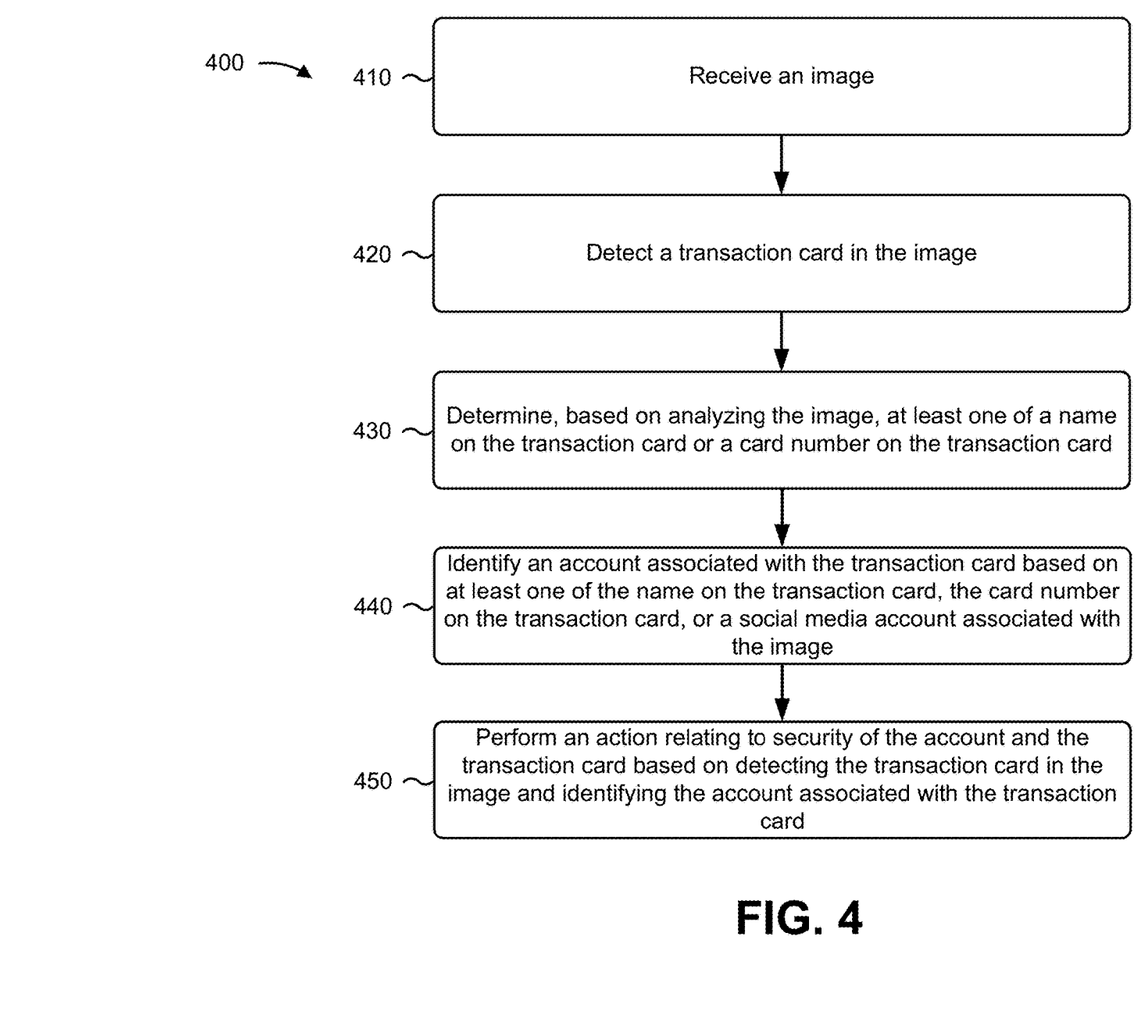
FIGS. 4-6 are flow charts of example processes for security and/or fraud prevention techniques based on detection of a transaction card in an image.

FIG. 4 is a flow chart of an example process 400 for security and fraud prevention techniques based on detection of a transaction card in an image. In some implementations, one or more process blocks of FIG. 4 may be performed by a transaction card security system (e.g., transaction card security system 250). In some implementations, one or more process blocks of FIG. 4 may be performed by another device or a group of devices separate from or including the transaction card security system, such as transaction card 210, transaction terminal 220, user device 230, image storage device 240, image processing device 260, security device 270, transaction backend 280, and/or the like.

As shown in FIG. 4, process 400 may include receiving an image (block 410). For example, the transaction card security system (e.g., using processor 320, memory 330, communication interface 370, and/or the like) may receive an image, as described above.

As further shown in FIG. 4, process 400 may include detecting a transaction card in the image (block 420). For example, the transaction card security system (e.g., using processor 320, memory 330, communication interface 370, and/or the like) may detect a transaction card in the image, as described above.

As further shown in FIG. 4, process 400 may include determining, based on analyzing the image, at least one of a name on the transaction card or a card number on the transaction card (block 430). For example, the transaction card security system (e.g., using processor 320, memory 330, communication interface 370, and/or the like) may determine a name on the transaction card and/or a card number on the transaction card, as described above. In some implementations, the transaction card security system may determine the name and/or the card number based on analyzing the image.

As further shown in FIG. 4, process 400 may include identifying an account associated with the transaction card based on at least one of the name on the transaction card, the card number on the transaction card, or a social media account associated with the image (block 440). For example, the transaction card security system (e.g., using processor 320, memory 330, communication interface 370, and/or the like) may identify an account associated with the transaction card based on the name, the card number, and/or a social media account associated with the image, as described above.

As further shown in FIG. 4, process 400 may include performing an action relating to security of the account and the transaction card based on detecting the transaction card in the image and identifying the account associated with the transaction card (block 450). For example, the transaction card security system (e.g., using processor 320, memory 330, communication interface 370, and/or the like) may perform an action relating to security of the account and the transaction card based on detecting the transaction card in the image and identifying the account associated with the transaction card, as described above.

Process 400 may include additional aspects, such as any single aspect or any combination of aspects described below and/or in connection with one or more other processes described elsewhere herein.

In some implementations, the image is received based on processing a set of images associated with the social media account. In some implementations, identifying the account comprises identifying a financial institution associated with the card number. In some implementations, performing the action comprises sending a message to the financial institution, wherein the message includes at least one of: the name, a portion of the name, the card number, or a portion of the card number. In some implementations, identifying the account comprises identifying a cardholder account associated with the card number.

In some implementations, performing the action comprises at least one of: placing the transaction card on hold; cancelling the transaction card; generating a new card number, for the account, to replace the card number of the transaction card; issuing a new transaction card, to a cardholder of the account, to replace the transaction card; sending an instruction to delete the image from the social media account; sending a message to the social media account regarding the image; obscuring the transaction card in the image; or sending a message to a social media service provider associated with the social media account regarding the image. In some implementations, performing the action comprises sending a message to a cardholder associated with the account.

Although FIG. 4 shows example blocks of process 400, in some implementations process 400 may include additional blocks, fewer blocks, different blocks, or differently arranged blocks than those depicted in FIG. 4. Additionally, or alternatively, two or more of the blocks of process 400 may be performed in parallel.

Figure 5:
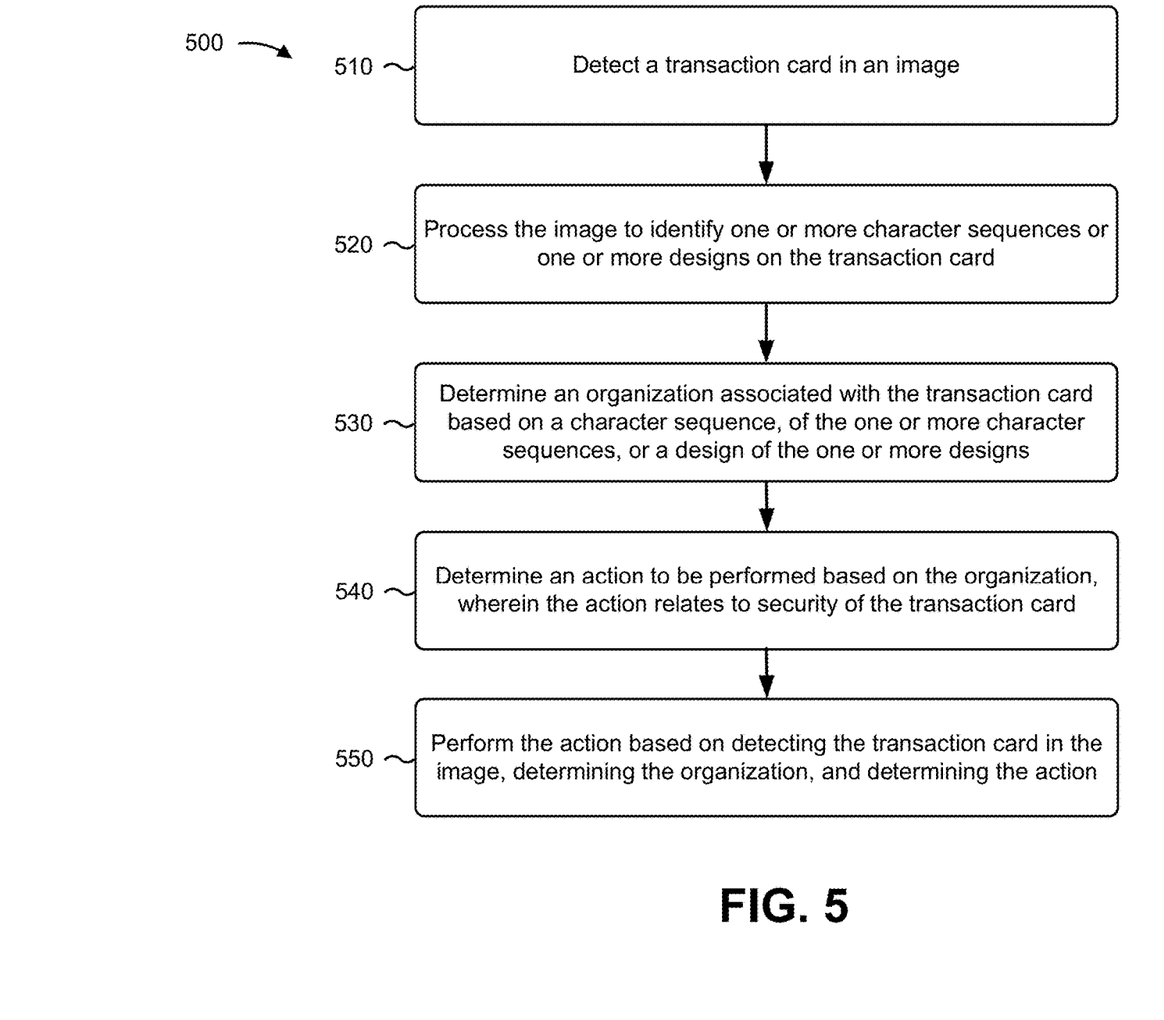

FIG. 5 is a flow chart of an example process 500 for security and fraud prevention techniques based on detection of a transaction card in an image. In some implementations, one or more process blocks of FIG. 5 may be performed by a transaction card security system (e.g., transaction card security system 250). In some implementations, one or more process blocks of FIG. 5 may be performed by another device or a group of devices separate from or including the transaction card security system, such as transaction card 210, transaction terminal 220, user device 230, image storage device 240, image processing device 260, security device 270, transaction backend 280, and/or the like.

As shown in FIG. 5, process 500 may include detecting a transaction card in an image (block 510). For example, the transaction card security system (e.g., using processor 320, memory 330, communication interface 370, and/or the like) may detect a transaction card in an image, as described above.

As further shown in FIG. 5, process 500 may include processing the image to identify one or more character sequences or one or more designs on the transaction card (block 520). For example, the transaction card security system (e.g., using processor 320, memory 330, communication interface 370, and/or the like) may process the image to identify one or more character sequences or one or more designs on the transaction card, as described above.

As further shown in FIG. 5, process 500 may include determining an organization associated with the transaction card based on a character sequence, of the one or more character sequences, or a design of the one or more designs (block 530). For example, the transaction card security system (e.g., using processor 320, memory 330, communication interface 370, and/or the like) may determine an organization associated with the transaction card based on a character sequence, of the one or more character sequences, or a design of the one or more designs, as described above.

As further shown in FIG. 5, process 500 may include determining an action to be performed based on the organization, wherein the action relates to security of the transaction card (block 540). For example, the transaction card security system (e.g., using processor 320, memory 330, communication interface 370, and/or the like) may determine an action to be performed based on the organization, as described above. In some implementations, the action relates to security of the transaction card.

As further shown in FIG. 5, process 500 may include performing the action based on detecting the transaction card in the image, determining the organization, and determining the action (block 550). For example, the transaction card security system (e.g., using processor 320, memory 330, communication interface 370, and/or the like) may perform the action based on detecting the transaction card in the image, determining the organization, and determining the action, as described above.

Process 500 may include additional aspects, such as any single aspect or any combination of aspects described below and/or in connection with one or more other processes described elsewhere herein.

In some implementations, the image is obtained from social media. In some implementations, determining the action to be performed based on the organization comprises determining a first action to be performed when the organization is a first financial institution, or determining a second action to be performed when the organization is a second financial institution. In some implementations, the second action may be different from the first action when the second financial institution is different from the first financial institution. In some implementations, the first action includes sending a message to the first financial institution. In some implementations, the second action includes sending a message to a cardholder associated with the second financial institution. In some implementations, the cardholder is identified based on the one or more character sequences.

In some implementations, the action includes at least one of: sending a message to the organization; sending a message to a cardholder associated with the transaction card; placing the transaction card on hold; cancelling the transaction card; flagging one or more transactions made using the transaction card; generating a new card number, for an account associated with the cardholder, to replace the card number of the transaction card; or issuing a new transaction card to replace the transaction card.

In some implementations, process 500 includes determining a location associated with the transaction card, and performing the action based on the location. In some implementations, the location is determined based on at least one of: recognition of an object included in the image, recognition of text included in the image, information included in a social media post that includes the image, or a time that the image was posted to social media and a corresponding time of a transaction for which the transaction card was used. In some implementations, the action includes at least one of: indicating the location in a message to be sent to the organization or a cardholder associated with the transaction card, or updating a risk score associated with the location. In some implementations, the action includes updating a risk score associated with a cardholder of the transaction card.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
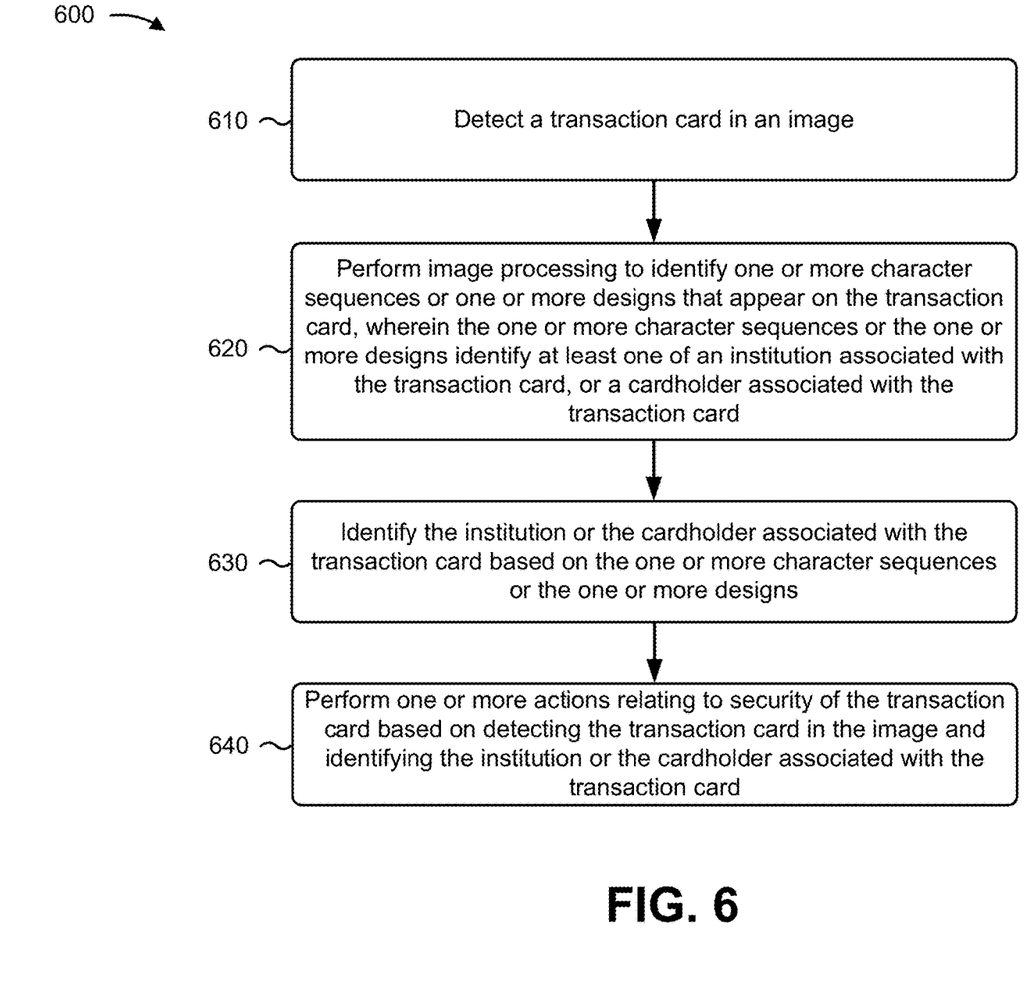

FIG. 6 is a flow chart of an example process 600 for security and fraud prevention techniques based on detection of a transaction card in an image. In some implementations, one or more process blocks of FIG. 6 may be performed by a transaction card security system (e.g., transaction card security system 250). In some implementations, one or more process blocks of FIG. 6 may be performed by another device or a group of devices separate from or including the transaction card security system, such as transaction card 210, transaction terminal 220, user device 230, image storage device 240, image processing device 260, security device 270, transaction backend 280, and/or the like.

As shown in FIG. 6, process 600 may include detecting a transaction card in an image (block 610). For example, the transaction card security system (e.g., using processor 320, memory 330, communication interface 370, and/or the like) may detect a transaction card in an image, as described above.

As further shown in FIG. 6, process 600 may include performing image processing to identify one or more character sequences or one or more designs that appear on the transaction card, wherein the one or more character sequences or the one or more designs identify at least one of an institution associated with the transaction card, or a cardholder associated with the transaction card (block 620). For example, the transaction card security system (e.g., using processor 320, memory 330, communication interface 370, and/or the like) may perform image processing to identify one or more character sequences or one or more designs that appear on the transaction card, as described above. In some implementations, the one or more character sequences or the one or more designs identify at least one of an institution associated with the transaction card or a cardholder associated with the transaction card As further shown in FIG. 6, process 600 may include identifying the institution or the cardholder associated with the transaction card based on the one or more character sequences or the one or more designs (block 630). For example, the transaction card security system (e.g., using processor 320, memory 330, communication interface 370, and/or the like) may identify the institution or the cardholder associated with the transaction card based on the one or more character sequences or the one or more designs, as described above.

As further shown in FIG. 6, process 600 may include performing one or more actions relating to security of the transaction card based on detecting the transaction card in the image and identifying the institution or the cardholder associated with the transaction card (block 640). For example, the transaction card security system (e.g., using processor 320, memory 330, communication interface 370, and/or the like) may perform one or more actions relating to security of the transaction card and/or the account based on detecting the transaction card in the image and identifying the institution or the cardholder associated with the transaction card, as described above.

Process 600 may include additional aspects, such as any single aspect or any combination of aspects described below and/or in connection with one or more other processes described elsewhere herein.

In some implementations, performing the one or more actions comprises performing a first action based on identifying the institution associated with the transaction card, and performing a second action based on identifying the cardholder associated with the transaction card. In some implementations, the institution includes at least one of a financial institution associated with the transaction card, or a card issuer of the transaction card. In some implementations, the image is obtained from a social media account associated with the cardholder based on authorization from the cardholder to analyze a set of images, including the image, associated with the social media account.

Although FIG. 6 shows example blocks of process 600, in some implementations process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    performing, by a system, image processing on a set of images in an image repository,
        wherein the set of images are input into a machine learning model, executing on the system, that has been trained to recognize one or more transaction cards in images, and
        wherein the machine learning model is trained based on a synthetically generated transaction card image,
            wherein the synthetically generated transaction card image is generated based on replacing one or more characters or that appears on a transaction card base image;
    detecting, by the system and based on performing the image processing, a transaction card in an image of the set of images;
    extracting, by the system, a character sequence or a design that appears on the transaction card;
    identifying, by the system, at least one of an organization or a cardholder associated with the transaction card based on at least one of:
        the character sequence, or
        the design; and
    performing, by the system, an action relating to security of the transaction card based on detecting the transaction card in the image and identifying at least one of the organization or the cardholder.

2. The method of claim 1, further comprising:
    determining a location associated with the set of images,
    wherein performing the action relating to security of the transaction card comprises:
        performing the action relating to security of the transaction card based on the location.

3. The method of claim 2, wherein performing the action relating to security of the transaction card based on the location comprises:
    updating a risk score associated with the location,
    indicating the location to a security device, or
    indicating the location in a message.

4. The method of claim 1, wherein performing the action relating to security of the transaction card includes one or more of:
    flagging the transaction card,
    placing the transaction card on hold,
    canceling the transaction card,
    generating a new card number to replace a card number of the transaction card, or
    generating one or more documents associated with the cardholder.

5. The method of claim 1, wherein the image repository is associated with a social media provider, and
    wherein performing the action relating to security of the transaction card comprises:
        determining contact information for a social media account associated with the cardholder,
            wherein the social media account is associated with the social media provider.

6. The method of claim 1, wherein the character sequence includes one or more of:
    a cardholder name,
    a portion of the cardholder name,
    a card number on the transaction card,
    a portion of the card number, or
    a name of a financial institution or company associated with the transaction card.

7. The method of claim 1, wherein the set of images includes a facial image of a person; and
    further comprising:
        identifying the person in the set of images via an image tag that links the facial image of the person to a social media account associated with the person;
        determining a name of the person based on the image tag; and
        comparing the name of the person based on the image tag to the character sequence.

8. A device, comprising:
    one or more memories; and
    one or more processors, communicatively coupled to the one or more memories, configured to:
        perform image processing on a set of images in an image repository,
            wherein the set of images are input into a machine learning model, executing on the device, that has been trained to recognize one or more transaction cards in images, and
            wherein the machine learning model is trained based on a synthetically generated transaction card image,
                wherein the synthetically generated transaction card image is generated based on replacing one or more characters or that appears on a transaction card base image;
        detect, based on performing the image processing, a transaction card in an image of the set of images;
        extract a character sequence or a design that appears on the transaction card;
        identify at least one of an organization or a cardholder associated with the transaction card based on at least one of:
            the character sequence, or
            the design; and
        perform an action relating to security of the transaction card based on detecting the transaction card in the image and identifying at least one of the organization or the cardholder.

9. The device of claim 8, wherein the one or more processors are further configured to:
  determine a location associated with the set of images, and
  wherein the one or more processors, when performing the action relating to security of the transaction card, are configured to:
    perform the action relating to security of the transaction card based on the location.

10. The device of claim 9, wherein the one or more processors, when performing the action relating to security of the transaction card based on the location, are configured to:
  update a risk score associated with the location,
  indicate the location to a security device, or
  indicate the location in a message.

11. The device of claim 8, wherein the one or more processors, when performing the action relating to security of the transaction card, are configured to:
  flag the transaction card,
  place the transaction card on hold,
  cancel the transaction card,
  generate a new card number to replace a card number of the transaction card, or
  generate one or more documents associated with the cardholder.

12. The device of claim 8, wherein the image repository is associated with a social media provider, and
  wherein the one or more processors, when performing the action relating to security of the transaction card, are configured to:
    determine contact information for a social media account associated with the cardholder,
      wherein the social media account is associated with the social media provider.

13. The device of claim 8, wherein the character sequence includes one or more of:
  a cardholder name,
  a portion of the cardholder name,
  a card number on the transaction card,
  a portion of the card number, or
  a name of a financial institution or company associated with the transaction card.

14. The device of claim 8, wherein the set of images includes a facial image of a person; and
  wherein the one or more processors are further to:
    identify the person in the set of images via an image tag that links the facial image of the person to a social media account associated with the person;
    determine a name of the person based on the image tag; and
    compare the name of the person based on the image tag to the character sequence.

15. A non-transitory computer-readable medium storing a set of instructions, the set of instructions comprising:
  one or more instructions that, when executed by one or more processors of a device, cause the device to:
    perform image processing on a set of images in an image repository,
      wherein the set of images are input into a machine learning model, executing on the device, that has been trained to recognize one or more transaction cards in images, and
      wherein the machine learning model is trained based on a synthetically generated transaction card image,
      wherein the synthetically generated transaction card image is generated based on replacing one or more characters or that appears on a transaction card base image;
    detect, based on performing the image processing, a transaction card in an image of the set of images;
    extract a character sequence or a design that appears on the transaction card;
    identify at least one of an organization or a cardholder associated with the transaction card based on at least one of:
      the character sequence, or
      the design; and
    perform an action relating to security of the transaction card based on detecting the transaction card in the image and identifying at least one of the organization or the cardholder.

16. The non-transitory computer-readable medium of claim 15, wherein the one or more instructions further cause the device to:
  determine a location associated with the set of images, and
  wherein the one or more instructions, that cause the device to perform the action relating to security of the transaction card, cause the device to:
    perform the action relating to security of the transaction card based on the location.

17. The non-transitory computer-readable medium of claim 16, wherein the one or more instructions, that cause the device to perform the action relating to security of the transaction card based on the location, cause the device to:
  update a risk score associated with the location,
  indicate the location to a security device, or
  indicate the location in a message.

18. The non-transitory computer-readable medium of claim 15, wherein the one or more instructions, that cause the device to perform the action relating to security of the transaction card, cause the device to:
  flag the transaction card,
  place the transaction card on hold,
  cancel the transaction card,
  generate a new card number to replace a card number of the transaction card, or
  generate one or more documents associated with the cardholder.

19. The non-transitory computer-readable medium of claim 15, wherein the image repository is associated with a social media provider, and
  wherein the one or more instructions, that cause the device to perform the action relating to security of the transaction card, cause the device to:
    determine contact information for a social media account associated with the cardholder,
      wherein the social media account is associated with the social media provider.

20. The non-transitory computer-readable medium of claim 15, wherein the character sequence includes one or more of:
  a cardholder name,
  a portion of the cardholder name,
  a card number on the transaction card,
  a portion of the card number, or
  a name of a financial institution or company associated with the transaction card.

* * * * *

UNITED STATES PATENT AND TRADEMARK OFFICE
CERTIFICATE OF CORRECTION

PATENT NO. : 11,574,313 B2
APPLICATION NO. : 17/247718
DATED : February 7, 2023
INVENTOR(S) : Reza Farivar et al.

It is certified that error appears in the above-identified patent and that said Letters Patent is hereby corrected as shown below:

In the Claims

In Claim 1, Column 19, Line 40, "characters or that appears on a transaction card" should be changed to -- characters that appear on a transaction card --;

In Claim 8, Column 20, Line 52, "characters or that appears on a transaction card" should be changed to -- characters that appear on a transaction card --;

In Claim 15, Column 22, Line 3, "characters or that appears on a transaction card" should be changed to -- characters that appear on a transaction card --.

Signed and Sealed this
Seventh Day of March, 2023

Katherine Kelly Vidal
*Director of the United States Patent and Trademark Office*